United States Patent
Tie et al.

(10) Patent No.: US 8,843,748 B2
(45) Date of Patent: Sep. 23, 2014

(54) METHOD FOR ESTABLISHING SECURE NETWORK ARCHITECTURE, METHOD AND SYSTEM FOR SECURE COMMUNICATION

(75) Inventors: Manxia Tie, Xi'an (CN); Jun Cao, Xi'an (CN); Qin Li, Xi'an (CN); Li Ge, Xi'an (CN)

(73) Assignee: China IWNCOMM Co., Ltd., Xi'an (CN)

( * ) Notice: Subject to any disclaimer, the term of this patent is extended or adjusted under 35 U.S.C. 154(b) by 39 days.

(21) Appl. No.: 13/702,217

(22) PCT Filed: Jan. 10, 2011

(86) PCT No.: PCT/CN2011/070122
§ 371 (c)(1),
(2), (4) Date: Dec. 5, 2012

(87) PCT Pub. No.: WO2011/153830
PCT Pub. Date: Dec. 15, 2011

(65) Prior Publication Data
US 2013/0080783 A1    Mar. 28, 2013

(30) Foreign Application Priority Data

Jun. 7, 2010 (CN) .......................... 2010 1 0195724

(51) Int. Cl.
H04L 29/06 (2006.01)
H04L 9/08 (2006.01)
H04L 12/18 (2006.01)
(52) U.S. Cl.
CPC ............ *H04L 9/0844* (2013.01); *H04L 63/061* (2013.01); *H04L 12/18* (2013.01)
USPC ....................................................... 713/171
(58) Field of Classification Search
None
See application file for complete search history.

(56) References Cited

U.S. PATENT DOCUMENTS

| 7,401,217 B2 | 7/2008 | Huang et al. |
| 2002/0037736 A1 | 3/2002 | Kawaguchi et al. |
| 2007/0064950 A1 | 3/2007 | Suzuki et al. |
| 2007/0206537 A1* | 9/2007 | Cam-Winget et al. ........ 370/331 |
| 2008/0022389 A1* | 1/2008 | Calcev et al. .................... 726/14 |

(Continued)

FOREIGN PATENT DOCUMENTS

| CN | 1602107 A | 3/2005 |
| CN | 1602108 A | 3/2005 |

(Continued)

OTHER PUBLICATIONS

Li, Ping et al., Research on Essential Nodes in Pairwise Key-sharing Graph of Sensor Networks, Computer Engineering and Applications, Feb. 2010, No. 4, pp. 100-102, ISSN 1002-8331.

(Continued)

*Primary Examiner* — Hadi Armouche
*Assistant Examiner* — Andrew Steinle
(74) *Attorney, Agent, or Firm* — Harness, Dickey & Pierce, P.L.C.

(57) ABSTRACT

A method for establishing a secure network architecture, a method and system for secure communication are provided. The method for establishing a secure network architecture includes: 1) constructing the network architecture where the identities of nodes are legal, including: neighboring node discovery; performing identities certification and shared key negotiation between a node and the neighbor node; 2) constructing a secure switching device architecture, including: establishing a shared key between every two of the switch devices.

9 Claims, 3 Drawing Sheets

(56) References Cited

U.S. PATENT DOCUMENTS

| | | | |
|---|---|---|---|
| 2008/0170550 A1* | 7/2008 | Liu et al. | 370/338 |
| 2009/0013175 A1* | 1/2009 | Elliott | 713/154 |
| 2010/0265824 A1* | 10/2010 | Chao et al. | 370/235 |
| 2012/0060205 A1 | 3/2012 | Tie et al. | |
| 2012/0278623 A1 | 11/2012 | Tie et al. | |

FOREIGN PATENT DOCUMENTS

| | | |
|---|---|---|
| CN | 1667999 A | 9/2005 |
| CN | 101562811 A | 10/2009 |
| CN | 101674179 A | 3/2010 |
| CN | 101741547 A | 6/2010 |
| CN | 101854244 A | 10/2010 |
| JP | H11-239176 A | 8/1999 |
| JP | 2002111679 A | 4/2002 |
| JP | 2005117626 A | 4/2005 |
| JP | 2007088799 A | 4/2007 |
| JP | 2008259148 A | 10/2008 |
| JP | 2012527135 A | 11/2012 |
| JP | 2013514682 A | 4/2013 |
| WO | WO-2009/085717 A2 | 7/2009 |

OTHER PUBLICATIONS

IEEE Std 802.3™—2008, IEEE Standard for Information technology—Telecommunications and information exchange between systems—Local and metropolitan area networks—specific requirements, IEEE Computer Society, Dec. 26, 2008.

International Search Report (in Chinese with English translation) and Written Opinion (in Chinese) for PCT/CN2011 070122, mailed Apr. 21, 2011; ISA/CN.

* cited by examiner

METHOD FOR ESTABLISHING SECURE NETWORK ARCHITECTURE, METHOD AND SYSTEM FOR SECURE COMMUNICATION

CROSS-REFERENCE TO RELATED APPLICATIONS

This application is a 371 National Stage Application of International Application No. PCT/CN2011/070122, filed on Jan. 10, 2011, which claims the priority of Chinese patent application No. 201010195724.8, titled "METHOD AND COMMUNICATION FOR ESTABLISHMENT AND SECURE COMMUNICATION OF THREE-STAGE NETWORK ARCHITECTURE" and filed with the Chinese Patent Office on Jun. 7, 2010, which are hereby incorporated by reference in their entirety.

FIELD OF THE INVENTION

The present invention relates to the field of security application of communication network, and particularly to a method for establishing a secure network architecture, and a method and a system for secure communication.

BACKGROUND OF THE INVENTION

A wired local area network is typically a broadcasting network, and data transmitted from a node can be received by other nodes. Various nodes on the network share channels, which brings a great hidden security danger to the network. An attacker can capture all data packets on the network as long as he accesses the network to listen, and therefore key information is stolen.

In the prior art, the local area network LAN defined by the national standard GB/T 15629.3 (corresponding to IEEE 802.3 or ISO/IEC 8802-3) provides no data security method; and a data encryption protocol provided by the IEEE 802.1AE standard implements a safety transmission of data between nodes in the network based on a safety measure of hop-by-hop encryption. However, such safety measure brings a large computing load to switch devices in the local area network and the attacker is inclined to attack the switch devices; and also transmission delay of a data packet transmitted from a transmitting node to a destination node is increased, therefore the transmission efficiency of the network is decreased.

The wired local area network has a complicated topological structure and relates to large numbers of nodes, and therefore the data communication in the network is complicated. If a static key pair is distributed to the nodes in the local area network to establish a session key between the nodes, the distribution and updating processes will be extremely complicated. Therefore, the method of using the static key pair is not suitable for the establishment of the session key between the nodes.

SUMMARY OF THE INVENTION

An object of the present invention is to provide a method and a system for secure communication, to overcome the hidden security dangers in the existing local area network and reduce the computing load of the switch devices in the local area network and the data transmission delay while ensuring the security of the communication.

Embodiments of the present invention provide the following technical solutions.

A method for establishing a secure network architecture is provided, including:

1) constructing a network architecture in which identities of nodes are legal, which includes:
discovering a neighboring node; and
performing an identity authentication and a shared key negotiation between the neighboring node and a node;
2) constructing a secure switch device architecture, which includes: establishing a shared key between every two switch devices.

Preferably, discovering the neighboring node includes:
multicasting a neighboring node discovering request packet by a new node after the new node joins in the network;
extracting information of the new node from the neighboring node discovering request packet upon reception of the multicasted neighboring node discovering request packet message, adding the extracted information of the new node into a neighboring node list of any of the nodes in the network and unicasting a neighboring node discovering response packet to the new node, by the any of the nodes in the network; and
extracting information of the response node from the neighboring node discovering response packet upon reception of the neighboring node discovering response packet, and adding the extracted information of the response node into a neighboring node list of the new node, by the new node.

Preferably, the method includes:
a switch route exploring process, including: exploring a first switch device and a last switch device a route from a transmitting source node to a destination node passes; and
a secure communication process, including: performing a three-stage secure communication through the explored switch route.

Exploring the first switch device and the last switch device the route from the transmitting source node to the destination node passes includes:
transmitting a switch route exploring request packet to the destination node $N_{Destination}$ by the transmitting source node $N_{Source}$, where the switch route exploring request packet includes switch route information from the transmitting source node $N_{Source}$ to the destination node $N_{Destination}$ which has been known by the transmitting source node $N_{Source}$, and the switch route information from the transmitting source node $N_{Source}$ to the destination node $N_{Destination}$ is an identification four-tuple [$ID_{Source}$, $ID_{SW-first}$, $ID_{SW-last}$, $ID_{Destination}$], where
the $ID_{Source}$ represents an identifier of the transmitting source node $N_{Source}$;
the $ID_{SW-first}$ represents an identifier of the first switch device SW-first the route from the transmitting source node $N_{Source}$ to the destination node $N_{Destination}$ passes;
the $ID_{SW-last}$ represents an identifier of the last switch device SW-last the route from the transmitting source node $N_{Source}$ to the destination node $N_{Destination}$ passes;
the $ID_{Destination}$ represents an identifier of the destination node $N_{Destination}$; and
transmitting a switch route exploring response packet to the transmitting source node $N_{Source}$ upon reception of the switch route exploring request packet, by the destination node $N_{Destination}$.

Optionally, each of the identifiers of the IDs in the four-tuple is identity ID information or MAC address information.

Preferably, if the transmitting source node $N_{Source}$ knows the first switch device SW-first the route from the transmitting source node $N_{Source}$ to the destination node $N_{Destination}$ passes and the destination node $N_{Destination}$ knows the last switch device SW-last the route from the transmitting source node $N_{Source}$ to the destination node $N_{Destination}$ passes, filling the four-tuple with information of the $ID_{Source}$, the $ID_{SW\text{-}first}$ and the $ID_{Destination}$ during construction of the switch route exploring request packet, and transmitting the switch route exploring request packet to the destination node $N_{Destination}$, by the transmitting source node $N_{Source}$; and filling in information of the $ID_{SW\text{-}last}$ during construction of the switch route exploring response packet, and transmitting the switch route exploring response packet to the transmitting source node $N_{Source}$, by the destination node $N_{Destination}$.

Preferably, if the transmitting source node $N_{Source}$ does not know information of the first switch device SW-first the route from the transmitting source node $N_{Source}$ to the destination node $N_{Destination}$ passes or the destination node $N_{Destination}$ does not know information of the last switch device SW-last the route from the transmitting source node $N_{Source}$ to the destination node $N_{Destination}$ passes, filling the four-tuple with information of the $ID_{Source}$ and the $ID_{Destination}$ during construction of the switch route exploring request packet, and transmitting the switch route exploring request packet to the destination node $N_{Destination}$, by the transmitting source node $N_{Source}$; filling the four-tuple with the information of the $ID_{SW\text{-}first}$ upon reception of the switch route exploring request packet, and forwarding the switch route exploring request packet, by the first switch device SW-first the route to the destination node $N_{Destination}$ passes; filling the four-tuple with the information of the $ID_{SW\text{-}last}$ upon reception of the switch route exploring request packet, and forwarding the switch route exploring request packet to the destination node $N_{Destination}$, by the last switch device SW-last the route to the destination node $N_{Destination}$ passes; and transmitting the known information of the four-tuple to the transmitting source node $N_{Source}$ during construction of the switch route exploring response packet, by the destination node $N_{Destination}$.

Preferably, performing the three-stage secure communication through the explored switch route includes:

transmitting a data packet to the destination node $N_{Destination}$ in a data security manner by the transmitting source node $N_{Source}$.

Preferably, transmitting the data packet to the destination node $N_{Destination}$ in the data security manner by the transmitting source node $N_{Source}$ includes:

encrypting the data packet by using a shared key $KEY_{S\text{-}F}$ between the transmitting source node $N_{Source}$ and the first switch device SW-first, and transmitting the encrypted data packet to the destination node $N_{Destination}$, by the transmitting source node $N_{Source}$;

decrypting the encrypted data packet transmitted from the transmitting source node $N_{Source}$ to the destination node $N_{Destination}$ by using the shared key $KEY_{S\text{-}F}$ between the transmitting source node $N_{Source}$ and the first switch device SW-first upon reception of the data packet, and then encrypting the data packet by using a shared key $KEY_{F\text{-}L}$ between the first switch device SW-first and the last switch device SW-last and forwarding the encrypted data packet, by the first switch device SW-first;

forwarding the encrypted data packet transmitted from the transmitting source node $N_{Source}$ to the destination node $N_{Destination}$ directly by an intermediate switch;

decrypting the encrypted data packet transmitted from the transmitting source node $N_{Source}$ to the destination node $N_{Destination}$ by using the shared key $KEY_{F\text{-}L}$ between the first switch device SW-first and the last switch device SW-last upon reception of the data packet, and then encrypting the data packet by using a shared $KEY_{L\text{-}D}$ between the last switch device SW-last and the destination node $N_{Destination}$ and forwarding the encrypted data packet, by the last switch device SW-last; and decrypting the encrypted data packet transmitted from the transmitting source node $N_{Source}$ by using the shared key $KEY_{L\text{-}D}$ between the last switch device SW-last and the destination node $N_{Destination}$ upon reception of the data packet to obtain data information transmitted from the transmitting source node $N_{Source}$, by the destination node $N_{Destination}$.

An embodiment of the present invention also provides a system for establishment and secure communication of a secure network architecture, including a user terminal and switch devices, each of the user terminal and the switch devices obtains information of all neighboring nodes by a neighboring node discovering process, and obtains shared keys between the user terminal or the switch device itself and the neighboring nodes by performing an authentication and a negotiation with the neighboring nodes; and the switch devices also establish shared keys between every two switch devices.

Optionally, the user terminal and the switch device in the system have four specific node identities when a secure data communication is initiated: a transmitting source node $N_{Source}$, a first switch device SW-first, a last switch device SW-last and a destination node $N_{Destination}$, where the transmitting source node $N_{Source}$ is used for constructing a switch route exploring request packet and transmitting it to the destination node $N_{Destination}$; receiving a switch route exploring response packet from the destination node $N_{Destination}$, encrypting user data transmitted to the destination node $N_{Destination}$ by using a shared key between the transmitting source node $N_{Source}$ and the first switch device SW-first and then transmitting the encrypted user data; and decrypting an encrypted data packet which comes from the destination node $N_{Destination}$ by using the shared key between the transmitting source node $N_{Source}$ and the first switch device SW-first to obtain information;

the first switch device SW-first is used for modifying the switch route exploring request packet transmitted from the transmitting source node $N_{Source}$ to the destination node $N_{Destination}$ and then forwarding the switch route exploring request packet; extracting information of a four-tuple from a switch route exploring response packet transmitted from the destination node $N_{Destination}$ to the transmitting source node $N_{Source}$ and storing the information of the four-tuple, and then forwarding the switch route exploring response packet; decrypting an encrypted data packet transmitted from the transmitting source node $N_{Source}$ to the destination node $N_{Destination}$ by using the shared key between the transmitting source node $N_{Source}$ and the first switch device SW-first, encrypting the data packet by using a shared key between the first switch device SW-first and the last switch device SW-last, and then forwarding the encrypted data packet; and decrypting the encrypted data packet transmitted from the destination node $N_{Destination}$ to the transmitting source node $N_{Source}$ by using the shared key between the first switch device SW-first and the last switch device SW-last, encrypting the data packet by using the shared key between the transmitting source node $N_{Source}$ and the first switch device SW-first, and then forwarding the encrypted data packet;

the last switch device SW-last is used for modifying the switch route exploring request packet transmitted from the transmitting source node $N_{Source}$ to the destination node $N_{Destination}$, and then forwarding the switch route exploring request packet; extracting the information of the four-tuple from the switch route exploring response packet transmitted from the destination node $N_{Destination}$ to the transmitting source node $N_{Source}$ and storing the information of the four-tuple, and then forwarding the switch route exploring response packet; decrypting the encrypted data packet transmitted from the transmitting source node $N_{Source}$ to the destination node $N_{Destination}$ by using the shared key between the first switch device SW-first and the last switch device SW-last, encrypting the data packet by using a shared key between the last switch device SW-last and the destination node $N_{Destination}$, and then forwarding the encrypted data packet; and decrypting the encrypted data packet transmitted from the destination node $N_{Destination}$ to the transmitting source node $N_{Source}$ by using the shared key between the last switch device SW-last and the destination node $N_{Destination}$, encrypting the data packet by using the shared key between the first switch device SW-first and the last switch device SW-last, and then forwarding the data packet; and the destination node $N_{Destination}$ is used for receiving the switch route exploring request packet transmitted from the transmitting source node $N_{Source}$, extracting the information of the four-tuple from the switch route exploring request packet and storing the information of the four-tuple; transmitting the switch route exploring response packet to the transmitting source node $N_{Source}$; encrypting user data transmitted to the transmitting source node $N_{Source}$ by using the shared key between the last switch device SW-last and the destination node $N_{Destination}$, and then transmitting the encrypted user data; and decrypting the encrypted data packet which comes from the transmitting source node $N_{Source}$ by using the shared key between the last switch device SW-last and the destination node $N_{Destination}$ to obtain information.

Preferably, the system further includes: an intermediate switch device SW-M which is a switch device that can receive a communication data packet between a transmitting source node $N_{Source}$ and a destination node $N_{Destination}$ but does not appear in a switch four-tuple, the intermediate switch device is used for directly forwarding a switch route exploring request packet, a switch route exploring response packet and an encrypted data packet between the transmitting source node $N_{Source}$ and the destination node $N_{Destination}$.

Advantages of the method for establishing the secure network architecture as well as the method and the system for secure communication provided by embodiments of the present invention are as follows: in the secure network architecture, the user terminal stores only the shared key between the user terminal itself and its neighboring switch device, and the switch device stores the shared key between the switch terminal itself and its neighboring user terminal and the shared keys between the switch terminal itself and all other switch devices, then a three-stage secure network architecture is established to ensure a three-stage secure data communication between a transmitting node and a destination node. For secure data communications in such architecture, the shared communication key between the transmitting node and the destination node does not need to be established, and the secure data transmission does not need to be implemented in a hop-by-hop encryption manner.

DETAILED DESCRIPTION OF THE INVENTION

For better understanding of solutions of embodiments of the present invention by those skilled in the art, the embodiments of the present invention will be described in detail below in conjunction with drawings and implementations.

An embodiment of the present invention provides a method for establishing a secure network architecture, in the embodiment, a network architecture in which identities of nodes are legal is constructed firstly; and then a secure switch device architecture is constructed.

Constructing the network architecture in which the identities of the nodes are legal includes: a neighboring node discovering process; and an identity authentication and shared key negotiation process between a node and a neighboring node. The two processes will be described in detail below respectively.

(1) The neighboring node discovering process mainly includes the following steps:

a new node multicasts a neighboring node discovering request packet actively after joining in the network;

any of the nodes in the network, after receiving the multicasted neighboring node discovering request packet message, extracts information of the new node from the neighboring node discovering request packet, adds the extracted information of the new node into its neighboring node list, constructs a neighboring node discovering response packet and unicasts the neighboring node discovering response packet to the new node; and the new node, after receiving the unicasted neighboring node discovering response packet message responded by the other node, extracts information of the response node from the neighboring node discovering response packet and adds the extracted information of the response node into its neighboring node list; therefore the current neighboring node discovering process is accomplished.

(2) The identity authentication and shared key negotiation process between the node and the neighboring node includes the following steps:

the node, after adding information of the new neighboring node into its neighboring node list, initiates the identity authentication and shared key negotiation process with the new neighboring node and finally obtains a shared key between the node and the neighboring node by the negotiation.

Preferably, the identity authentication and shared key negotiation between the node and the neighboring node is performed between switch devices or between a switch device and a user terminal.

Constructing a secure switch device architecture includes the following process: establishing shared keys between every two switch devices.

Figure 1:
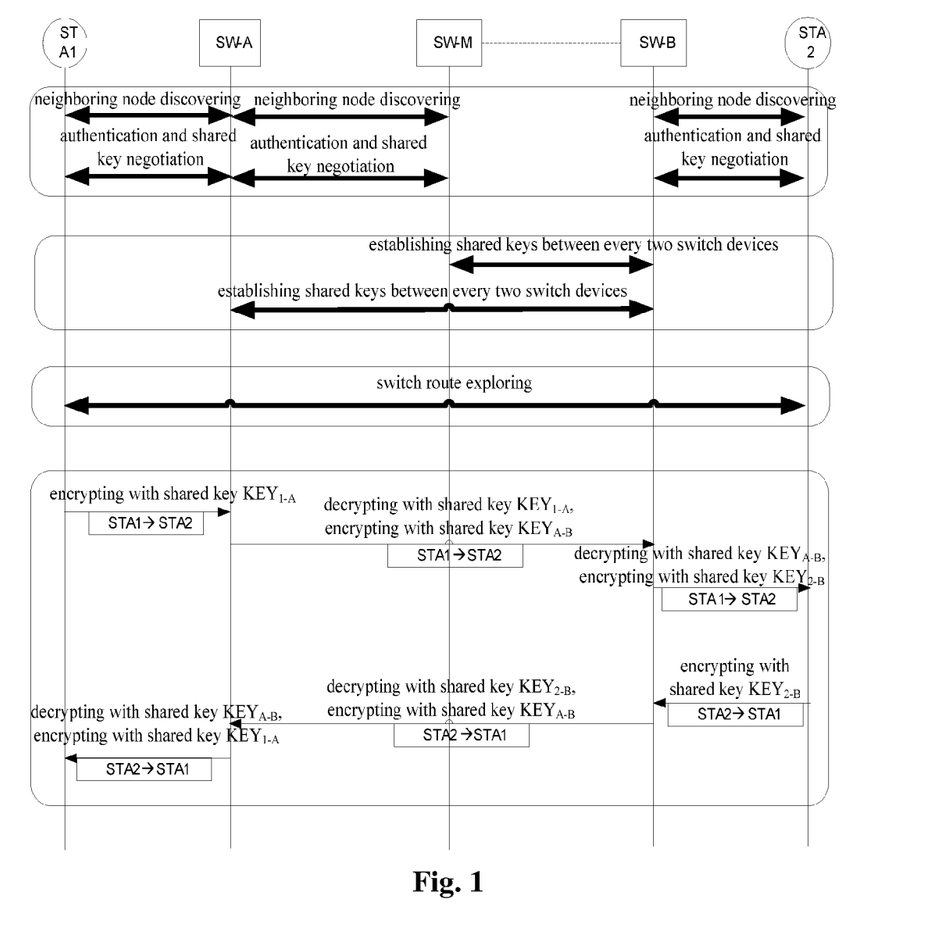
FIG. 1 is a flowchart of an embodiment of the present invention.

Referring to FIG. 1, provided that the network includes the following nodes: a switch device SW-A, a switch device SW-B, a neighboring switch device SW-M, a terminal STA1 and a terminal STA2.

By the neighboring node discovering process and the identity authentication and shared key negotiation process between the node and the neighboring node described above, the switch device in the network establishes shared keys between the switch device itself and its neighboring switch devices, and subsequently selects one of the neighboring switch devices (the specific selection mechanism is not limited and defined by the embodiment of the invention) to establish shared keys between the switch device itself and all other non-neighboring switch devices in the network.

For example, the switch device SW-A selects the neighboring switch device SW-M to establish a shared key between the switch device SW-A and any of the non-neighboring switch devices SW-B, the SW-M can generate a random number which is to be used as the shared key between the SW-A and the SW-B, and then the SW-A and the SW-B is notified of the generated random number in an encryption manner by using the shared key between the SW-M and the SW-A and the shared key between the SW-M and the SW-B, and in such way shared keys between every two switch devices can be established.

By the above processes, a secure network architecture can be established.

Based on the secure network architecture, an embodiment of the present invention also provides a method for secure communication, including: a switch route exploring process and a secure communication process. The two processes will be described in detail below respectively.

The switch route exploring process includes: exploring a first switch device and a last switch device a route from a transmitting source node to a destination node passes, which can be implemented specifically by the following steps:

the transmitting source node $N_{Source}$ transmits a switch route exploring request packet to the destination node $N_{Destination}$;

the destination node $N_{Destination}$ transmits a switch route exploring response packet to the transmitting source node $N_{Source}$ after receiving the switch route exploring request packet.

Preferably, the switch route information from the transmitting source node $N_{Source}$ to the destination node $N_{Destination}$ is defined as an identification four-tuple [$ID_{Source}$, $ID_{SW-first}$, $ID_{SW-last}$, $ID_{Destination}$], where the $ID_{Source}$ represents an identifier of the transmitting source node $N_{Source}$;

the $ID_{SW-first}$ represents an identifier of the first switch device SW-first the route from the transmitting source node $N_{Source}$ to the destination node $N_{Destination}$ passes;

the $ID_{SW-last}$ represents an identifier of the last switch device SW-last the route from the transmitting source node $N_{Source}$ to the destination node $N_{Destination}$ passes; and the $ID_{Destination}$ represents an identifier of the destination node $N_{Destination}$.

A switch device which can receive a data packet communicated between the transmitting source node $N_{Source}$ and the destination node $N_{Destination}$ but is not in the identification four-tuple is defined as an intermediate switch device on the communication link between the transmitting source node $N_{Source}$ and the destination node $N_{Destination}$.

Preferably, in a practical implementation, each of the identifiers of the IDs in the above identification four-tuple may be identity ID information or MAC address information.

In an example where the transmitting source node $N_{Source}$ is STA1 and the destination node $N_{Destination}$ is STA2, the STA1 and the STA2 can obtain information of the four-tuple [$ID_{STA1}$, $ID_{SW\_A}$, $ID_{SW\_B}$, $ID_{STA2}$] by the above two steps.

Preferably, in a practical implementation, if the STA1 knows that the first switch device the route to the STA2 passes is SW-A and the STA2 knows that the first switch device the route to the STA1 passes is SW-B, the STA1 fills the four-tuple with the information of the $ID_{Source}$, the $ID_{SW-first}$ and the $ID_{Destination}$ ($ID_{Source}=ID_{STA1}$, $ID_{SW-first}=ID_{SW-A}$, $ID_{Destination}=ID_{STA2}$) when constructing the switch route exploring request packet and transmits the switch route exploring request packet to the STA2; and the STA2 fills in the information of the $ID_{SW-last}$ ($ID_{SW-last}=ID_{SW-B}$) when constructing the switch route exploring response packet and transmits the switch route exploring response packet to the STA1.

Preferably, in a practical implementation, if the STA1 does not know the information of the first switch device the route to the STA2 passes and the STA2 does not know the information of the first switch device the route to the STA1 passes, the STA1 fills the four-tuple with the information of the $ID_{Source}$ and the $ID_{Destination}$ ($ID_{Source}=ID_{STA1}$, $ID_{Destination}=ID_{STA2}$) when constructing the switch route exploring request packet and transmits the switch route exploring request packet to the STA2; the SW-A fills the four-tuple with the information of the $ID_{SW-first}$ ($ID_{SW-first}=ID_{SW-A}$) when receiving the switch route exploring request packet and then forwards the switch route exploring request packet; the SW-B fills the four-tuple with the information of the $ID_{SW-last}$ ($ID_{SW-last}=ID_{SW-B}$) when receiving the switch route exploring request packet and finding that the STA2 is its neighboring node, and forwards the switch route exploring request packet to the STA2; the STA2 transmits the known information of the four-tuple to the STA1 when constructing the switch route exploring response packet.

By the above switch route exploring process, each of the STA1, SW-A, SW-B, STA2 can know the information of the first switch device and the last switch device the route from the STA1 to the STA2 passes and the information of the first switch device and the last switch device the route from the STA2 to the STA1 passes.

In a practical implementation, in a mixed networking of general switch devices and encryption switch devices, the switch route exploring protocol is implemented on the encryption switch devices, and the switch route information, i.e, the information of the first encryption switch device and the last encryption switch device that the route from the STA1 to the STA2 passes, is explored by using the above switch route exploring process.

The secure communication process includes: performing a three-stage secure data communication through the explored switch route.

An example of a secure data communication where the transmitting source node $N_{Source}$ is STA1 and the destination node $N_{Destination}$ is STA2 is used for illustration below.

The STA1 transmits a data packet to the STA2 in the three-stage data security manner, which is implemented specifically by the following steps:

(1) the STA1 encrypts the data packet by using a shared key $KEY_{1-A}$ between the STA1 and the SW-A, and transmits the data packet to the STA2;

(2) the SW-A decrypts the encrypted data packet transmitted from the STA1 to the STA2 by using the shared key $KEY_{1-A}$ between the SW-A and the STA1 after receiving the data packet, and then encrypts the data packet by using a shared key $KEY_{A-B}$ between the SW-A and the SW-B and forwards the encrypted data packet;

(3) an intermediate switch device directly forwards the encrypted data packet transmitted from the STA1 to the STA2;

(4) the SW-B decrypts the encrypted data packet transmitted from the STA1 to the STA2 by using the shared key $KEY_{A-B}$ between the SW-B and the SW-A after receiving the data packet; and then encrypts the data packet by using a shared key $KEY_{2-B}$ between the SW-B and the STA2 and forwards the encrypted data packet; and (5) the STA2 decrypts the encrypted data packet transmitted from the STA1 by using the shared key $KEY_{2-B}$ between the STA2 and the SW-B after receiving the data packet, to obtain data information transmitted from the STA1.

The STA2 transmits a data packet to the STA1 in the three-stage data security manner, which is implemented specifically by the following steps:

(1) the STA2 encrypts the data packet by using the shared key $KEY_{2-B}$ between the STA2 and the SW-B, and transmits the encrypted data packet to the STA1;

(2) the SW-B decrypts the encrypted data packet transmitted from the STA2 to the STA1 by using the shared key $KEY_{2-B}$ between the SW-B and the STA2 after receiving the data packet, and then encrypts the data packet by using the shared key $KEY_{A-B}$ between the SW-B and the SW-A and forwards the encrypted data packet;

(3) the intermediate switch device directly forwards the encrypted data packet transmitted from the STA2 to the STA1;

(4) the SW-A decrypts the encrypted data packet transmitted from the STA2 to the STA1 by using the shared key $KEY_{A-B}$ between the SW-A and the SW-B after receiving the data packet, and then encrypts the data packet by using the shared key $KEY_{1-A}$ between the SW-A and the STA1 and forwards the encrypted data packet; and (5) the STA1 decrypts the encrypted data packet transmitted from the STA2 by using the shared key $KEY_{1-A}$ between the STA1 and the SW-A after receiving the data packet, to obtain data information transmitted from the STA2.

Figure 2:
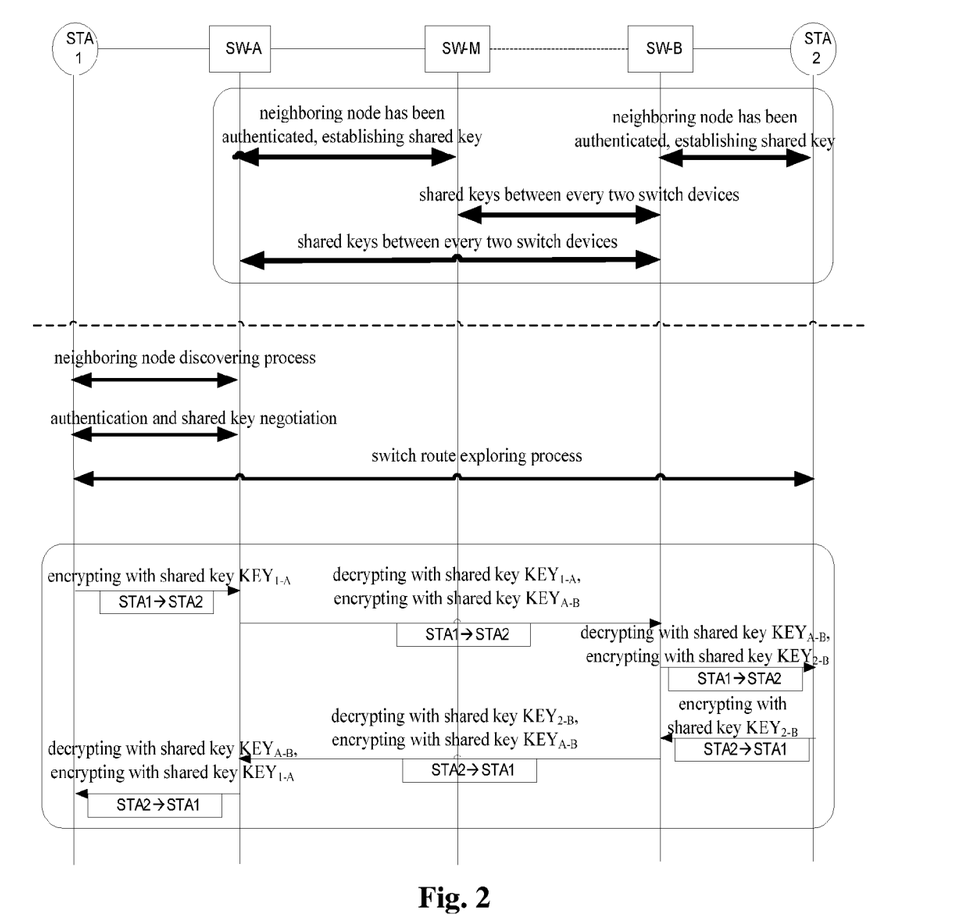
FIG. 2 is a schematic diagram of a first embodiment of the present invention.

In a first embodiment, the user terminal STA1 is used as a new node to access the current network.

As shown in FIG. 2, before the STA1 accesses the network, all nodes in the network have known their neighboring nodes, and have performed authentication and established shared keys with their neighboring nodes; and shared keys have been established between every two switch devices. When the STA1 accesses the current network, the subsequent process is shown in a portion of FIG. 2 under the dotted line.

The STA1 initiates a neighboring node discovering process to let all neighboring nodes know information of STA1, and meanwhile the STA1 obtains information of all neighboring nodes; the STA1 and the neighboring nodes (especially the neighboring switch devices) initiate authentication and shared key negotiation processes to establish secure paths between the STA1 and the neighboring nodes.

If the STA1 needs to perform a secure data communication with the STA2, the STA1 initiates a switch route exploring process to let the STA1, SW-A, SW-B, STA2 obtain information of the first switch device and the last switch device the route from the STA1 to the STA2 passes, i.e. obtain switch route information from the STA1 to the STA2; the data communication between the STA1 and the STA2 is performed by using three secure paths, i.e. the secure transmission between the STA1 and the SW-A is performed by using the shared key $KEY_{1-A}$, the secure transmission between the SW-A and the SW-B is performed by using the shared key $KEY_{A-B}$, and the secure transmission between the SW-B and the STA2 is performed by using the shared key $KEY_{B-2}$.

Figure 3:
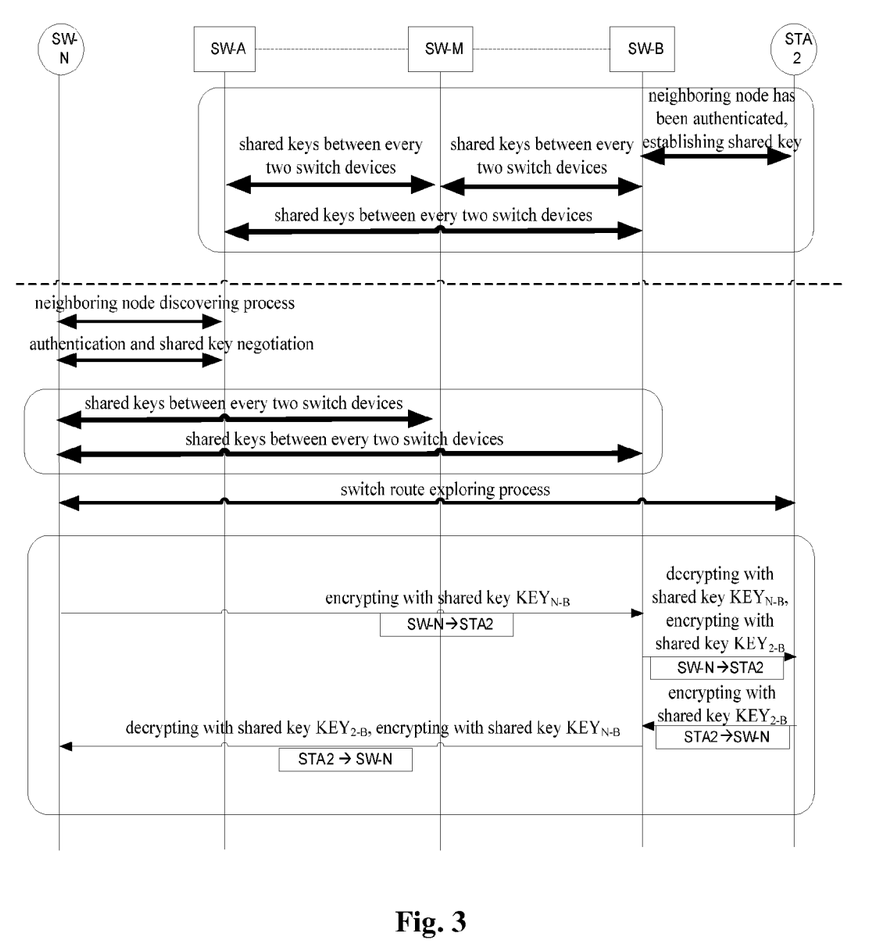
FIG. 3 is a schematic diagram of a second embodiment of the present invention.

In a second embodiment, a switch device SW-N is used as a new node to access the current network.

As shown in FIG. 3, before the SW-N accesses the network, all nodes in the network have known their neighboring nodes, and have performed authentication and established shared keys with their neighboring nodes; and shared keys have been established between every two switch devices. When the SW-N accesses the current network, the subsequent process is shown in a portion of FIG. 3 under the dotted line.

The SW-N initiates a neighboring node discovering process to let all neighboring nodes know information of the SW-N, and meanwhile the SW-N obtains information of all neighboring nodes; the SW-N and the neighboring nodes initiate authentication and shared key negotiation processes to establish secure paths between the SW-N and the neighboring nodes; the SW-N selects a neighboring node (such as SW-A) to establish shared keys between the SW-N and all other non-neighboring switch devices in the network, such as a shared key between the SW-N and the SW-M and a shared key between the SW-N and the SW-B as shown in the drawing.

Thereafter, if the SW-N needs to perform secure data communication with the STA2, the SW-N initiates a switch route exploring process to let the SW-N, SW-B, STA2 obtain information of the first switch device and the last switch device the route from the SW-N to the STA2 passes, i.e. obtain switch route information from the SW-N to the STA2; in the present embodiment, the first switch device found is the SW-N itself; since the SW-N is the SW-first, the data communication between the SW-N and the STA2 is performed by using a simplified three-stage secure path, i.e. the secure transmission between the SW-N and the SW-B is performed by using a shared key $KEY_{N-B}$, and the secure transmission between the SW-B and the STA2 is performed by using a shared key $KEY_{B-2}$.

If the SW-N needs to perform secure data communication with the SW-M, it can be known that the transmitting node is the SW-first and the destination node is the SW-last without performing a switch route exploring since the two communication parties are both switch devices; and the secure transmission can be performed directly by using a shared key $KEY_{N-M}$ therebetween, which is the most simplified three-stage secure communication.

An embodiment of the present invention also provides a system for establishment and secure communication of a secure network architecture, the system includes user terminals and switch devices, where each of the user terminals and the switch devices obtains information of all neighboring nodes by a neighboring node discovering process, and obtains shared keys between the user terminal or the switch device itself and the neighboring nodes by performing an authentication and a negotiation with the neighboring nodes; and the switch devices also establish shared keys between every two switch devices.

Optionally, the user terminals and the switch devices in the system may have four specific node identities when a secure data communication is initiated: a transmitting source node $N_{Source}$, a first switch device SW-first, a last switch device SW-last and a destination node $N_{Destination}$.

The transmitting source node $N_{Source}$ is used for constructing a switch route exploring request packet and transmitting it to the destination node $N_{Destination}$; receiving a switch route exploring response packet transmitted from the destination node $N_{Destination}$; encrypting user data transmitted to the destination node $N_{Destination}$ by using a shared key between the transmitting source node $N_{Source}$ and the first switch device SW-first and then transmitting the encrypted user data; and decrypting an encrypted data packet which comes from the destination node $N_{Destination}$ by using the shared key between the transmitting source node $N_{Source}$ and the first switch device SW-first to obtain information.

The first switch device SW-first is used for modifying the switch route exploring request packet transmitted from the transmitting source node $N_{Source}$ to the destination node $N_{Destination}$ and then forwarding the switch route exploring request packet; extracting information of a four-tuple from the switch route exploring response packet transmitted from the destination node $N_{Destination}$ to the transmitting source node $N_{Source}$, storing the information of the four-tuple, and then forwarding the switch route exploring response packet; decrypting the encrypted data packet transmitted from the transmitting source node $N_{Source}$ to the destination node $N_{Destination}$ by using the shared key between the first switch device SW-first and the transmitting source node $N_{Source}$; encrypting the data packet by using a shared key between the first switch device SW-first and the last switch device SW-last, and then forwarding the encrypted data packet; and decrypting the encrypted data packet transmitted from the destination node $N_{Destination}$ to the transmitting source node $N_{Source}$ by using the shared key between the first switch device SW-first and the last switch device SW-last, encrypting the data packet by using the shared key between the first switch device SW-first and the transmitting source node $N_{Source}$, and then forwarding the encrypted data packet.

The last switch device SW-last is used for modifying the switch route exploring request packet transmitted from the transmitting source node $N_{Source}$ to the destination node $N_{Destination}$, and then forwarding the data packet; extracting information of the four-tuple from the switch route exploring response packet transmitted from the destination node $N_{Destination}$ to the transmitting source node $N_{Source}$, storing the information of the four-tuple, and then forwarding the data packet; decrypting the encrypted data packet transmitted from the transmitting source node $N_{Source}$ to the destination node $N_{Destination}$ by using the shared key between the last switch device SW-last and the first switch device SW-first, encrypting the data packet by using a shared key between the last switch device SW-last and the destination node $N_{Destination}$, and then forwarding the encrypted data packet; and decrypting the encrypted data packet transmitted from the destination node $N_{Destination}$ to the transmitting source node $N_{Source}$ by using the shared key between the last switch device SW-last and the destination node $N_{Destination}$, encrypting the data packet by using the shared key between the last switch device SW-last and the first switch device SW-first, and then forwarding the encrypted data packet.

The destination node $N_{Destination}$ is used for receiving the switch route exploring request packet transmitted from the transmitting source node $N_{Source}$, extracting information of the four-tuple from the switch route exploring request packet, and storing the information of the four-tuple; transmitting the switch route exploring response packet to the transmitting source node $N_{Source}$; encrypting the user data transmitted to the transmitting source node $N_{Source}$ by using the shared key between the destination node $N_{Destination}$ and the last switch device SW-last, and then transmitting the encrypted user data; and decrypting the encrypted data packet which comes from the transmitting source node $N_{Source}$ by using the shared key between the destination node $N_{Destination}$ and the last switch device SW-last to obtain information.

The system for establishment and secure communication of the secure network architecture described above further includes:

an intermediate switch device SW-M which is a switch device that can receive a communication data packet between the transmitting source node $N_{Source}$ and the destination node $N_{Destination}$ but does not appear in the switch four-tuple, where the intermediate switch device is used for directly forwarding the switch route exploring response packet and the encrypted data packet between the transmitting source node $N_{Source}$ and the destination node $N_{Destination}$.

The invention claimed is:

1. A method for establishing a secure network architecture, comprising:
   1) constructing a network architecture in which identities of nodes are legal, comprising:
      discovering a neighboring node; and
      performing an identity authentication and a shared key negotiation between the neighboring node and a node; and
   2) constructing a secure switch device architecture, comprising: establishing a shared key between every two switch devices,
   the method further comprises:
   a switch route exploring process, comprising: exploring a first switch device and a last switch device a route from a transmitting source node to a destination node passes; and
   a secure communication process, comprising: performing a three-stage secure communication through the explored switch route,
   wherein exploring the first switch device and the last switch device the route from the transmitting source node to the destination node passes comprises:
      transmitting a switch route exploring request packet to the destination node $N_{Destination}$ by the transmitting source node $N_{Source}$, wherein the switch route exploring request packet comprises switch route information from the transmitting source node $N_{Source}$ to the destination node $N_{Destination}$ which has been known by the transmitting source node $N_{Source}$, and the switch route information from the transmitting source node $N_{Source}$ to the destination node $N_{Destination}$ is an identification four-tuple $[ID_{Source}, ID_{SW-first}, ID_{SW-last}, ID_{Destination}]$, wherein
      the $ID_{Source}$ represents an identifier of the transmitting source node $N_{Source}$;
      the $ID_{SW-first}$ represents an identifier of the first switch device SW-first the route from the transmitting source node $N_{Source}$ to the destination node $N_{Destination}$ passes;
      the $ID_{SW-last}$ represents an identifier of the last switch device SW-last the route from the transmitting source node $N_{Source}$ to the destination node $N_{Destination}$ passes; and
      the $ID_{Destination}$ represents an identifier of the destination node $N_{Destination}$; and
      transmitting a switch route exploring response packet to the transmitting source node $N_{Source}$ upon reception of the switch route exploring request packet, by the destination node $N_{Destination}$.

2. The method according to claim 1, wherein discovering the neighboring node comprises:
   multicasting a neighboring node discovering request packet by a new node after the new node joins in the network;
   extracting information of the new node from the neighboring node discovering request packet upon reception of the multicasted neighboring node discovering request packet message, adding the extracted information of the new node into a neighboring node list of any of the nodes in the network and unicasting a neighboring node discovering response packet to the new node, by the any of the nodes in the network; and
   extracting information of a response node from the neighboring node discovering response packet upon reception of the neighboring node discovering response packet, and adding the extracted information of the response node into a neighboring node list of the new node, by the new node.

3. The method according to claim 1, wherein each of the identifiers of the IDs in the four-tuple is identity ID information or MAC address information.

4. The method according to claim 1, wherein
   if the transmitting source node $N_{Source}$ knows the first switch device SW-first the route from the transmitting source node $N_{source}$ to the destination node $N_{Destination}$ passes and the destination node $N_{Destination}$ knows the last switch device SW-last the route from the transmitting source node $N_{Source}$ to the destination node $N_{Destination}$ passes, filling the four-tuple with information of the $ID_{Source}$, the $ID_{SW\text{-}first}$ and the $ID_{Destination}$ during construction of the switch route exploring request packet, and transmitting the switch route exploring request packet to the destination node $N_{Destination}$, by the transmitting source node $N_{Source}$; and filling in information of the $ID_{SW\text{-}last}$ during construction of the switch route exploring response packet, and transmitting the switch route exploring response packet to the transmitting source node $N_{Source}$, by the destination node $N_{Destination}$.

5. The method according to claim 1, wherein if the transmitting source node $N_{Source}$ does not know information of the first switch device SW-first the route from the transmitting source node $N_{Source}$ to the destination node $N_{Destination}$ passes or the destination node $N_{Destination}$ does not know information of the last switch device SW-last the route from the transmitting source node $N_{Source}$ to the destination node $N_{Destination}$ passes, filling the four-tuple with information of the $ID_{Source}$ and the $ID_{Destination}$ during construction of the switch route exploring request packet, and transmitting the switch route exploring request packet to the destination node $ND_{Destination}$, by the transmitting source node $N_{Source}$;

filling the four-tuple with the information of the $ID_{SW\text{-}first}$ upon reception of the switch route exploring request packet, and forwarding the switch route exploring request packet, by the first switch device SW-first the route to the destination node $N_{Destination}$ passes;

filling the four-tuple with the information of the $ID_{SW\text{-}last}$ upon reception of the switch route exploring request packet, and forwarding the switch route exploring request packet to the destination node $N_{Destination}$, by the last switch device SW-last the route to the destination node $N_{Destination}$ passes; and transmitting the known information of the four-tuple to the transmitting source node $N_{Source}$ during construction of the switch route exploring response packet, by the destination node $N_{Destination}$.

6. The method according to claim 1, wherein performing the three-stage secure communication through the explored switch route comprises:

transmitting a data packet to the destination node $N_{Destination}$ in a data security manner by the transmitting source node $N_{Source}$.

7. The method according to claim 6, wherein transmitting the data packet to the destination node $N_{Destination}$ in the data security manner by the transmitting source node $N_{Source}$ comprises:

encrypting the data packet by using a shared key $KEY_{S\text{-}F}$ between the transmitting source node $N_{Source}$ and the first switch device SW-first, and transmitting the encrypted data packet to the destination node $N_{Destination}$, by the transmitting source node $N_{Source}$;

decrypting the encrypted data packet transmitted from the transmitting source node $N_{Source}$ to the destination node $N_{Destination}$ by using the shared key $KEY_{S\text{-}F}$ between the transmitting source node $N_{Source}$ and the first switch device SW-first upon reception of the data packet, and then encrypting the data packet by using a shared key $KEY_{F\text{-}L}$ between the first switch device SW-first and the last switch device SW-last and forwarding the encrypted data packet, by the first switch device SW-first;

forwarding the encrypted data packet transmitted from the transmitting source node $N_{Source}$ to the destination node $N_{Destination}$ directly by an intermediate switch device;

decrypting the encrypted data packet transmitted from the transmitting source node $N_{Source}$ to the destination node $N_{Destination}$ by using the shared key $KEY_{F\text{-}L}$ between the first switch device SW-first and the last switch device SW-last upon reception of the data packet, and then encrypting the data packet by using a shared $KEY_{LD}$ between the last switch device SW-last and the destination node $N_{Destination}$ and forwarding the encrypted data packet, by the last switch device SW-last; and decrypting the encrypted data packet transmitted from the transmitting source node $N_{Source}$ by using the shared key $KEY_{L\text{-}D}$ between the last switch device SW-last and the destination node $N_{Destination}$ upon reception of the data packet to obtain data information transmitted from the transmitting source node $N_{Source}$, by the destination node $N_{Destination}$.

8. A system for establishment and secure communication of a secure network architecture, comprising a user terminal and switch devices, each of the user terminal and the switch devices obtains information of all neighboring nodes by a neighboring node discovering process, and obtains shared keys between the user terminal or the switch devices and the neighboring nodes by performing an authentication and a negotiation with the neighboring nodes; and the switch devices also establish shared keys between every two switch devices, and the user terminal and the switch devices in the system have four specific node identities when a secure data communication is initiated: a transmitting source node $N_{Source}$, a first switch device SW-first, a last switch device SW-last and a destination node $N_{Destination}$, wherein the transmitting source node $N_{Source}$ is used for constructing a switch route exploring request packet and transmitting it to the destination node $N_{Destination}$; receiving a switch route exploring response packet from the destination node $N_{Destination}$; encrypting user data transmitted to the destination node $N_{Destination}$ by using a shared key between the transmitting source node $N_{Source}$ and the first switch device SW-first and then transmitting the encrypted user data; and decrypting an encrypted data packet which comes from the destination node $N_{Destination}$ by using the shared key between the transmitting source node NSource and the first switch device SW-first to obtain information;

the first switch device SW-first is used for modifying the switch route exploring request packet transmitted from the transmitting source node $N_{Source}$ to the destination node $N_{Destination}$ and then forwarding the switch route exploring request packet; extracting information of a four-tuple from a switch route exploring response packet transmitted from the destination node $N_{Destination}$ to the transmitting source node $N_{Source}$ and storing the information of the four-tuple, and then forwarding the switch route exploring response packet; decrypting an encrypted data packet transmitted from the transmitting source node $N_{Source}$ to the destination node $N_{Destination}$ by using the shared key between the transmitting source node $N_{Source}$ and the first switch device SW-first, encrypting the data packet by using a shared key between the first switch device SW-first and the last switch device SW-last, and then forwarding the encrypted data packet; and decrypting the encrypted data packet transmitted from the destination node $N_{Destination}$ to the transmitting source node $N_{Source}$ by using the shared key between the first switch device SW-first and the last switch device SW-last, encrypting the data packet by using the shared key between the transmitting source node $N_{Source}$ and the first switch device SW-first, and then forwarding the encrypted data packet;

the last switch device SW-last is used for modifying the switch route exploring request packet transmitted from the transmitting source node $N_{Source}$ to the destination node $N_{Destination}$, and then forwarding the switch route exploring request packet; extracting the information of the four-tuple from the switch route exploring response packet transmitted from the destination node $N_{Destination}$ to the transmitting source node $N_{Source}$ and storing the information of the four-tuple, and then forwarding the switch route exploring response packet; decrypting the encrypted data packet transmitted from the transmitting source node $N_{Source}$ to the destination node $N_{Destination}$ by using the shared key between the first switch device SW-first and the last switch device SW-last, encrypting the data packet by using a shared key between the last switch device SW-last and the destination node $N_{Destination}$, and then forwarding the encrypted data packet; and decrypting the encrypted data packet transmitted from the destination node $N_{Destination}$ to the transmitting source node $N_{Source}$ by using the shared key between the last switch device SW-last and the destination node $N_{Destination}$, encrypting the data packet by using the shared key between the first switch device SW-first and the last switch device SW-last, and then forwarding the data packet; and the destination node $N_{Destination}$ is used for receiving the switch route exploring request packet transmitted from the transmitting source node $N_{Source}$, extracting the information of the four-tuple from the switch route exploring request packet and storing the information of the four-tuple; transmitting the switch route exploring response packet to the transmitting source node $N_{Source}$; encrypting user data transmitted to the transmitting source node $N_{source}$ by using the shared key between the last switch device SW-last and the destination node $N_{Destination}$, and then transmitting the encrypted user data; and decrypting the encrypted data packet which comes from the transmitting source node $N_{Source}$ by using the shared key between the last switch device SW-last and the destination node $N_{Destination}$ to obtain information.

9. The system according to claim 8, further comprising: an intermediate switch device SW-M which is a switch device that can receive a communication data packet between a transmitting source node $N_{source}$ and a destination node $N_{Destination}$ but does not appear in a switch four-tuple, the intermediate switch device is used for directly forwarding a switch route exploring request packet, a switch route exploring response packet and an encrypted data packet between the transmitting source node $N_{Source}$ and the destination node $N_{Destination}$.

* * * * *